US012804272B2

(12) United States Patent
Li

(10) Patent No.: US 12,804,272 B2
(45) Date of Patent: Nov. 17, 2026

(54) IMAGE PROCESSING METHOD, IMAGE PROCESSING CIRCUIT, ELECTRONIC DEVICE, AND READABLE STORAGE MEDIUM

(71) Applicant: VIVO MOBILE COMMUNICATION CO., LTD., Guangdong (CN)

(72) Inventor: Yujiang Li, Guangdong (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 41 days.

(21) Appl. No.: 19/070,918

(22) Filed: Mar. 5, 2025

(65) Prior Publication Data

US 2025/0203223 A1 Jun. 19, 2025

Related U.S. Application Data

(63) Continuation of application No. PCT/CN2023/117742, filed on Sep. 8, 2023.

(30) Foreign Application Priority Data

Sep. 9, 2022 (CN) ........................ 202211103547.5

(51) Int. Cl.
*H04N 23/80* (2023.01)
*G06T 1/20* (2006.01)
(Continued)

(52) U.S. Cl.
CPC ............... *H04N 23/80* (2023.01); *G06T 5/00* (2013.01); *G06T 2200/28* (2013.01)

(58) Field of Classification Search
CPC ....... H04N 23/80; G06T 5/00; G06T 2200/28; G06T 1/20
See application file for complete search history.

(56) References Cited

U.S. PATENT DOCUMENTS 8,488,017 B2 * 7/2013 Niida ................ H04N 21/2187 348/222.1
10,613,870 B2 * 4/2020 Frascati ................ H04N 23/80
(Continued)

FOREIGN PATENT DOCUMENTS

CN 112399087 A 2/2021
CN 113542757 A 10/2021
(Continued)

OTHER PUBLICATIONS

PCT International Search Report and Written Opinion, Int. Application No. PCT/CN2023/117742, Int. Filing Date: Sep. 8, 2023, Applicant: Vivo Mobile Communication Co., Ltd., Dated: Nov. 24, 2023.

(Continued)

*Primary Examiner* — Ahmed A Berhan
(74) *Attorney, Agent, or Firm* — Reising Ethington P.C.

(57) ABSTRACT

This application discloses an image processing method, an image processing circuit, an electronic device, and a readable storage medium. The image processing method, including: receiving, by a main control chip, first image data acquired by an image sensor; transmitting, by a camera hardware abstraction layer in the main control chip, the first image data to an image enhancement chip through a first data transmission path, where the first data transmission path is formed by sequentially connecting the camera hardware abstraction layer, a direct rendering manager, display hardware, and the image enhancement chip; and performing, by the image enhancement chip, image enhancement on the first image data to obtain second image data.

20 Claims, 8 Drawing Sheets

(51) Int. Cl.

| | |
|---|---|
| ***G06T 5/00*** | (2006.01) |
| ***G06T 15/00*** | (2011.01) |

(56) References Cited

U.S. PATENT DOCUMENTS

| | | | | |
|---|---|---|---|---|
| 11,074,082 | B2 * | 7/2021 | Frascati | ................ G06F 9/5061 |
| 2018/0091773 | A1 | 3/2018 | Moussa | |
| 2020/0218541 | A1 | 7/2020 | Frascati et al. | |
| 2021/0374454 | A1 | 12/2021 | Wang et al. | |
| 2024/0346616 | A1 | 10/2024 | Li et al. | |

FOREIGN PATENT DOCUMENTS

| | | | |
|---|---|---|---|
| CN | 114268707 | A | 4/2022 |
| CN | 115665342 | A | 1/2023 |
| CN | 116419049 | A | 7/2023 |
| WO | 2022178471 | A1 | 8/2022 |

OTHER PUBLICATIONS

EP Office Action, Application No. 23862518.0-1207 / 4586602 PCT/CN2023117742, Applicant: Vivo Mobile Communication Co., Ltd., Dated: Oct. 10, 2025.

* cited by examiner

IMAGE PROCESSING METHOD, IMAGE PROCESSING CIRCUIT, ELECTRONIC DEVICE, AND READABLE STORAGE MEDIUM

CROSS-REFERENCE TO RELATED APPLICATIONS

This application is a continuation application of PCT International Application No. PCT/CN2023/117742 filed on Sep. 8, 2023, which claims priority to Chinese Patent Application No. 202211103547.5, filed in China on Sep. 9, 2022, which is incorporated herein by reference in its entirety.

TECHNICAL FIELD

This disclosure relates to the field of data processing technologies, and specifically relates to an image processing method, an image processing circuit, an electronic device, and a readable storage medium.

BACKGROUND

With the development of image processing technologies, people have increasingly high requirements on images displayed by electronic devices. To ensure that electronic devices can output high-quality images required by users, various chips for processing images are typically arranged within the electronic devices in the prior art. However, existing image processing methods typically spend a relatively long time in an image processing process. Therefore, the existing image processing methods have the problem of relatively long processing time.

SUMMARY

According to a first aspect, an embodiment of this application provides an image processing method, including:

- receiving, by a main control chip, first image data acquired by an image sensor;
- transmitting, by a camera hardware abstraction layer (camera HAL) in the main control chip, the first image data to an image enhancement chip through a first data transmission path, where the first data transmission path is formed by sequentially connecting the camera hardware abstraction layer (camera HAL), a direct rendering manager (DRM), display hardware (Display HW), and the image enhancement chip; and
- performing, by the image enhancement chip, image enhancement on the first image data to obtain second image data.

According to a second aspect, an embodiment of this application provides an image processing circuit, including: a main control chip and an image enhancement chip. The main control chip includes a camera hardware abstraction layer (camera HAL), a direct rendering manager (DRM), and display hardware (Display HW). The camera hardware abstraction layer (camera HAL) is connected to the image enhancement chip through a first data transmission path. The first data transmission path is formed by sequentially connecting the camera hardware abstraction layer (camera HAL), the direct rendering manager (DRM), the display hardware (Display HW), and the image enhancement chip.

The main control chip is configured to receive first image data acquired by an image sensor.

The camera hardware abstraction layer (camera HAL) is configured to transmit the first image data to the image enhancement chip through the first data transmission path.

The image enhancement chip is configured to perform image enhancement on the first image data to obtain second image data.

According to a third aspect, an embodiment of this application provides an electronic device including a processor and a memory. The memory stores a program or instructions capable of running on the processor. When the program or instructions are executed by the processor, the steps of the image processing method according to the first aspect are implemented.

According to a fourth aspect, an embodiment of this application provides a readable storage medium, where the readable storage medium stores a program or instructions, and when the program or instructions are executed by a processor, the steps of the image processing method according to the first aspect are implemented.

According to a fifth aspect, an embodiment of this application provides a chip, where the chip includes a processor and a communication interface, the communication interface is coupled to the processor, and the processor is configured to run a program or instructions to implement the steps of the image processing method according to the first aspect.

According to a sixth aspect, an embodiment of this application provides a computer program product. The program product is stored in a storage medium. The program product is executed by at least one processor to implement the steps of the image processing method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms “first”, “second”, and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, “first”, “second”, and the like are usually used to distinguish objects of a same type, and do not restrict a quantity of the objects. For example, there may be one or multiple first objects. In addition, “and/or” in the specification and claims represents at least one of connected objects, and the character “/” generally indicates that the associated objects have an “or” relationship.

The image processing method, image processing circuit, electronic device, and readable storage medium provided in the embodiments of this application are hereinafter described in detail by using specific embodiments and application scenarios thereof with reference to the accompanying drawings.

Figure 1:
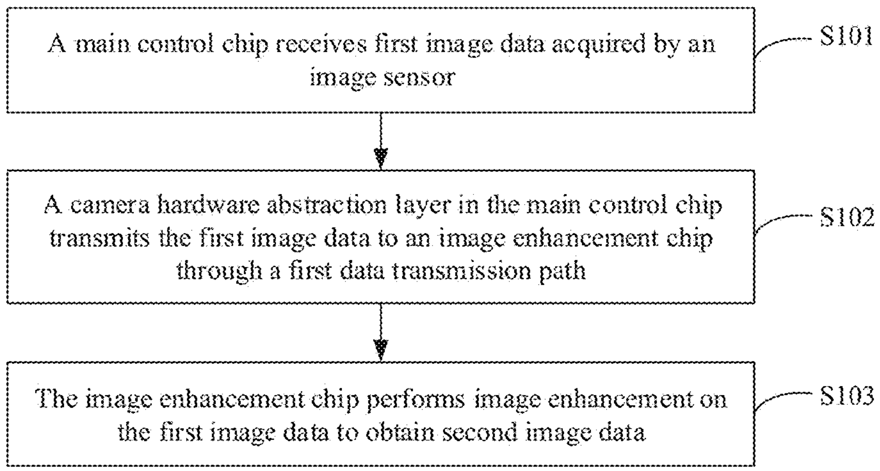
FIG. 1 is a schematic flowchart of an image processing method according to an embodiment of this application.

Referring to FIG. 1, FIG. 1 is a schematic flowchart of an image processing method according to an embodiment of this disclosure. The image processing method includes the following steps.

Step S101. A main control chip receives first image data acquired by an image sensor.

Step S102. A camera hardware abstraction layer (camera HAL) in the main control chip transmits the first image data to an image enhancement chip through a first data transmission path, where the first data transmission path is formed by sequentially connecting the camera hardware abstraction layer (camera HAL), a direct rendering manager (DRM), display hardware (Display HW), and the image enhancement chip.

Step S103. The image enhancement chip performs image enhancement on the first image data to obtain second image data.

The foregoing image processing method can be applied to various electronic devices having a shooting function and can also be applied to various monitoring systems, for example, can be applied to access monitoring systems.

The main control chip may be a system on chip (SOC), and the image sensor may be a camera sensor of a camera in an electronic device. The main control chip may include an image processing module, where the image processing module may be integrated into an image signal processor (ISP) in the main control chip. The image enhancement chip may be a tag-on image enhancement chip independent of the main control chip.

In some scenarios with a poor shooting environment, for example, a scenario with low brightness or a scenario with high contrast, due to the poor shooting environment, there may be numerous interference factors that affect shooting in the process of shooting the first image data. Consequently, the first image data captured by the image sensor typically has poor quality. If the first image data is processed by only the image processing module of the main control chip, image quality of the image data obtained may still be poor. In this case, the image enhancement chip can be further used to further process the first image data to improve the quality of images outputted by the camera.

In view of this, in this embodiment of this disclosure, after the main control chip receives the first image data acquired by the image sensor, the first image data may first be transmitted to the image enhancement chip through the first data transmission path, and the image enhancement chip may perform processes such as brightness enhancement, color enhancement, contrast enhancement, and noise reduction on the first image data to improve the quality of the images outputted by the camera of the electronic device. It can be understood that after the image enhancement chip processes the first image data to obtain the second image data, the image enhancement chip may transmit the second image data back to the main control chip, and the main control chip may then further process the second image data through the image processing module, to obtain target image data and display or record the target image data.

Figure 2:
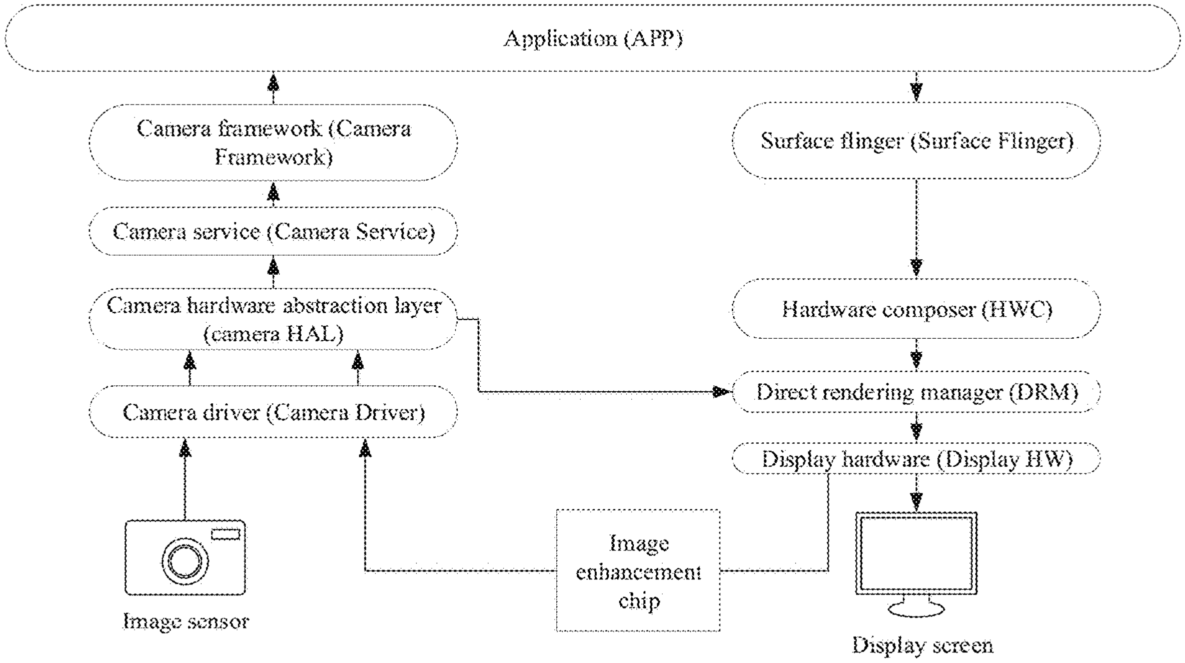
FIG. 2 is a schematic structural diagram of an image processing circuit according to an embodiment of this application.

FIG. 2 is an image processing circuit according to an embodiment of this disclosure. The foregoing image processing method can be implemented based on the image processing circuit. The image processing circuit includes a main control chip and an image enhancement chip. The main control chip includes an image processing module (not shown in the figure), a camera driver, a camera hardware abstraction layer (camera HAL), a camera service, a camera framework, an application (APP), a surface flinger, a hardware composer (HWC), a direct rendering manager (DRM), and display hardware (Display HW). The image sensor may be connected to the camera driver through the image processing module. An output end of the image enhancement chip may be connected to an input end of the image processing module, such that images processed by the image enhancement chip are conveniently transmitted back to the main control chip for further processing.

Referring to FIG. 2, the camera HAL is connected to the DRM, such that the camera hardware abstraction layer (camera HAL), the direct rendering manager (DRM), the display hardware (Display HW), and the image enhancement chip are sequentially connected to form the first data transmission path. In this way, when the first image data needs to be transmitted to the image enhancement chip for image enhancement, the first image data can be transmitted through the first data transmission path.

Whereas, in the related art, a data transmission path for transmitting the first image data is: camera hardware abstraction layer (camera HAL)→camera service→camera framework→application (APP)→surface flinger→hardware composer (HWC)→direct rendering manager (DRM)→display hardware (Display HW)→image enhancement chip.

It can be seen that in this embodiment of this disclosure, the first image data is transmitted through the first data transmission path, which can cancel the transmission link of “camera service→camera framework→APP→surface flinger→hardware composer (HWC)” in the transmission path, as compared to the related art. Therefore, an image data transmission path can be effectively shortened.

In addition, after the image enhancement chip performs image enhancement on the first image data to obtain the second image data, the image enhancement chip may transmit the second image data to a display screen through a second data transmission path for display, where the second data transmission path is: image enhancement chip→image processing module (not shown in the figure)→camera hardware abstraction layer (camera HAL)→camera service→camera framework→application (APP)→surface flinger→hardware composer (HWC)→direct rendering manager (DRM)→display hardware (Display HW)→display screen.

In this embodiment, the first image data is transmitted from the camera hardware abstraction layer (camera HAL)

to the image enhancement chip through the first data transmission path, which can shorten the image data transmission path, as compared to an image data transmission method in the related art. Therefore, time consumption in an image data transmission process can be reduced, thereby reducing latency in an image processing process.

Optionally, the first data transmission path further includes a direct rendering manager wrapper (DRMWrapper), where a data sending software interface of the image sensor and a data sending software interface of the direct rendering manager (DRM) are both wrapped in the direct rendering manager wrapper (DRMWrapper). The camera hardware abstraction layer (camera HAL) is connected to the direct rendering manager (DRM) through the direct rendering manager wrapper (DRMWrapper).

An interaction code between the hardware composer (HWC) and the direct rendering manager (DRM) may be analyzed, and then a software interface layer capable of performing code interaction with the direct rendering manager (DRM) is specifically integrated in the camera hardware abstraction layer (camera HAL), where the software interface layer can serve as the foregoing direct rendering manager wrapper (DRMWrapper).

In this embodiment, the data sending software interface of the image sensor and the data sending software interface of the direct rendering manager (DRM) are both wrapped in the direct rendering manager wrapper (DRMWrapper) to realize data transmission between the camera hardware abstraction layer (camera HAL) and the direct rendering manager (DRM), thereby forming the first data transmission path.

Optionally, the transmitting, by a camera hardware abstraction layer (camera HAL) in the main control chip, the first image data to an image enhancement chip through a first data transmission path includes:

converting, by the direct rendering manager wrapper (DRMWrapper), a data format of the first image data into a format matching the direct rendering manager (DRM) to obtain first intermediate data;

transmitting, by the direct rendering manager wrapper (DRMWrapper), the first intermediate data to the direct rendering manager (DRM); and transmitting, by the direct rendering manager (DRM), the first intermediate data to the image enhancement chip through the display hardware (Display HW).

The performing, by the image enhancement chip, image enhancement on the first image data to obtain second image data includes:

performing, by the image enhancement chip, image enhancement on the first intermediate data to obtain the second image data.

In this embodiment, the data format of the first image data is converted into the format matching the direct rendering manager (DRM) by the direct rendering manager wrapper (DRMWrapper). This helps the direct rendering manager (DRM) to further process the first intermediate data after receiving the first intermediate data and transmit the processed data to the image enhancement chip for image enhancement.

Optionally, the first image data includes a first image and a shooting timestamp of the first image; the transmitting, by a camera hardware abstraction layer (camera HAL) in the main control chip, the first image data to an image enhancement chip through a first data transmission path includes:

in a case that the first image data is transmitted to the direct rendering manager (DRM), synthesizing, by the direct rendering manager (DRM), the first image and the shooting timestamp to obtain second intermediate data; and the performing, by the image enhancement chip, image enhancement on the first image data to obtain second image data includes:

performing, by the image enhancement chip, image enhancement on the second intermediate data to obtain the second image data.

In an embodiment of this disclosure, the first image and the shooting timestamp of the first image are synthesized, such that after the main control chip subsequently receives the second image data obtained by processing the first image data by the image enhancement chip, whether a shooting timestamp in the first image data matches a shooting timestamp in the second image data can be checked to determine whether there is an anomaly such as frame loss while the image enhancement chip is processing the first image data.

For example, in an embodiment of this disclosure, the main control chip may continuously transmit multiple different pieces of first image data to the image enhancement chip through the first data transmission path. After the image enhancement chip completes the image enhancement for the multiple pieces of first image data, multiple pieces of second image data can be obtained. Upon receiving the multiple pieces of second image data, the main control chip may respectively acquire shooting timestamp data of the multiple pieces of first image data, and then determine whether each shooting timestamp in the shooting timestamp data has corresponding second image data. If there is corresponding second image data, it indicates that there is no frame loss anomaly in the image enhancement process of the image enhancement chip. If at least one shooting timestamp does not have corresponding second image data, it indicates that there is a frame loss anomaly in the image enhancement process of the image enhancement chip. In this case, the frame loss anomaly can be marked. In this way, frame interpolation can be subsequently performed at a frame loss position to avoid a display anomaly caused by frame loss.

In this embodiment, the first image and the shooting timestamp of the first image are synthesized by the direct rendering manager (DRM), such that the image data that is subsequently outputted from the image enhancement chip can carry a shooting timestamp of an image. This facilitates subsequent detection of a possible anomaly in the image processing process based on the shooting timestamp in the image.

Optionally, in an embodiment of this disclosure, the first image data includes a first image and a shooting timestamp of the first image; the transmitting, by a camera hardware abstraction layer (camera HAL) in the main control chip, the first image data to an image enhancement chip through a first data transmission path includes:

converting, by the direct rendering manager wrapper (DRMWrapper), a data format of the first image data into a format matching the direct rendering manager (DRM) to obtain first intermediate data;

transmitting, by the direct rendering manager wrapper (DRMWrapper), the first intermediate data to the direct rendering manager (DRM);

synthesizing, by the direct rendering manager (DRM), the first image and the shooting timestamp in the first intermediate data to obtain second intermediate data; and transmitting, by the direct rendering manager (DRM), the second intermediate data to the image enhancement chip through the display hardware (Display HW); and the performing, by the image enhancement chip, image enhancement on the first image data to obtain second image data includes:

performing, by the image enhancement chip, image enhancement on the second intermediate data to obtain the second image data.

A specific implementation process of this embodiment is similar to that of the foregoing embodiments, with the same beneficial effects achieved. To avoid repetition, details are not described herein again.

Optionally, the transmitting, by the direct rendering manager wrapper (DRMWrapper), the first intermediate data to the direct rendering manager (DRM) includes:

transmitting, by the direct rendering manager wrapper (DRMWrapper), identification information of a target buffer unit of the image sensor to the direct rendering manager (DRM), where the first intermediate data is stored in the target buffer unit; and acquiring, by the direct rendering manager (DRM) based on the identification information, the first intermediate data from the target buffer unit.

It can be understood that the first image data acquired by the image sensor may be buffered through the target buffer unit. In addition, the direct rendering manager wrapper (DRMWrapper) and the direct rendering manager (DRM) may respectively perform data reading and writing on the target buffer unit. After the direct rendering manager wrapper (DRMWrapper) converts the format of the first image data to obtain the first intermediate data, the first intermediate data may be buffered in the target buffer unit. Referring to FIG. 2, the camera hardware abstraction layer (camera HAL) may transmit the identification information to the direct rendering manager (DRM) through the direct rendering manager wrapper (DRMWrapper); and after acquiring the first intermediate data, the direct rendering manager (DRM) may send a data acquisition completion flag to the camera hardware abstraction layer (camera HAL) through the direct rendering manager wrapper (DRMWrapper).

The identification information may include address information of the target buffer unit. Thus, the direct rendering manager (DRM) may perform data reading and writing in the target buffer unit based on a storage address indicated by the identification information.

In this embodiment, upon receiving the identification information of the target buffer unit, the direct rendering manager (DRM) may locate a storage position of the first intermediate data based on the identification information, so as to acquire the first intermediate data from the target buffer unit, thereby implementing a data transmission process between the direct rendering manager wrapper (DRMWrapper) and the direct rendering manager (DRM).

Optionally, the method further includes:

in a case that the target buffer unit is accessed by the image sensor, enabling an acquire fence (acquire_fence) identifier of the target buffer unit to reject access of the direct rendering manager (DRM) to the target buffer unit;

in a case that the image sensor ends the access to the target buffer unit, releasing the acquire fence (acquire_fence) identifier to allow access of the direct rendering manager (DRM) to the target buffer unit;

in a case that the direct rendering manager (DRM) accesses the target buffer unit, enabling a release fence (release_fence) identifier of the target buffer unit to reject access of the image sensor to the target buffer unit; and in a case that the direct rendering manager (DRM) ends the access to the target buffer unit, releasing the release fence (release_fence) identifier to allow access of the image sensor to the target buffer unit.

That the target buffer unit is accessed by the image sensor may refer to a process of the image sensor reading and writing image data from the target buffer unit. That the direct rendering manager (DRM) accesses the target buffer unit may refer to a process of the direct rendering manager (DRM) reading and writing image data from the target buffer unit.

In this embodiment, the acquire fence (acquire_fence) identifier of the target buffer unit is enabled or released, or the release fence (release_fence) identifier of the target buffer unit is enabled or released to ensure that only one hardware module can read or write data in the target buffer unit at a same time, thereby avoiding the problem that while one hardware module is reading the data in the target buffer unit, data currently read by the hardware module reading the data is covered by new data written by another module. Thus, the image sensor can use a fence mechanism to notify the direct rendering manager (DRM) that the buffer data (buffer) in the target buffer unit is all used. Correspondingly, the direct rendering manager (DRM) can also use the fence mechanism to notify the image sensor that the buffer data (buffer) in the target buffer unit is all used. This helps to enhance a management effect for the buffer data in the target buffer unit.

Optionally, the method further includes:

in a case that a brightness parameter in the first image data indicates that an ambient brightness is lower than a preset brightness threshold, establishing, by the camera hardware abstraction layer (camera HAL), a connection between the direct rendering manager wrapper (DRMWrapper) and the direct rendering manager (DRM) to enable the first data transmission path; and in a case that the brightness parameter in the first image data indicates that the ambient brightness is not lower than the preset brightness threshold, releasing, by the camera hardware abstraction layer (camera HAL), the connection between the direct rendering manager wrapper (DRMWrapper) and the direct rendering manager (DRM) to disable the first data transmission path.

Specifically, when an ambient brightness of a current shooting scenario is lower than a preset brightness threshold, the current shooting scenario may be determined as a low-brightness shooting scenario. In this scenario, since the first image data acquired by the image sensor has relatively poor image quality, the camera hardware abstraction layer (camera HAL) may control the first data transmission path to be connected. In this case, after the main control chip receives the first image data acquired by the image sensor, the first image data may be first transmitted to the image enhancement chip through the first data transmission path for image enhancement, and then the main control chip further processes the image data processed by the image enhancement chip. In this way, the main control chip and the image enhancement chip are respectively used to process the image data captured in low-brightness environments, helping to improve the quality of images captured in low-brightness environments.

Correspondingly, when the ambient brightness of the current shooting scenario is not lower than the preset brightness threshold, the current shooting scenario may be determined as a normal shooting scenario. In this case, since the first image data acquired by the image sensor has relatively good image quality, the first image data may be processed by only the main control chip. Since there is no need to use the image enhancement chip for enhancement in this scenario, the camera hardware abstraction layer (camera HAL) may disable the connection between the direct rendering manager wrapper (DRMWrapper) and the direct rendering manager (DRM) so as to release resources in the direct rendering manager (DRM) that are occupied by the direct rendering manager wrapper (DRMWrapper). In addition, power consumption of the electronic device can also be reduced.

Figure 6:
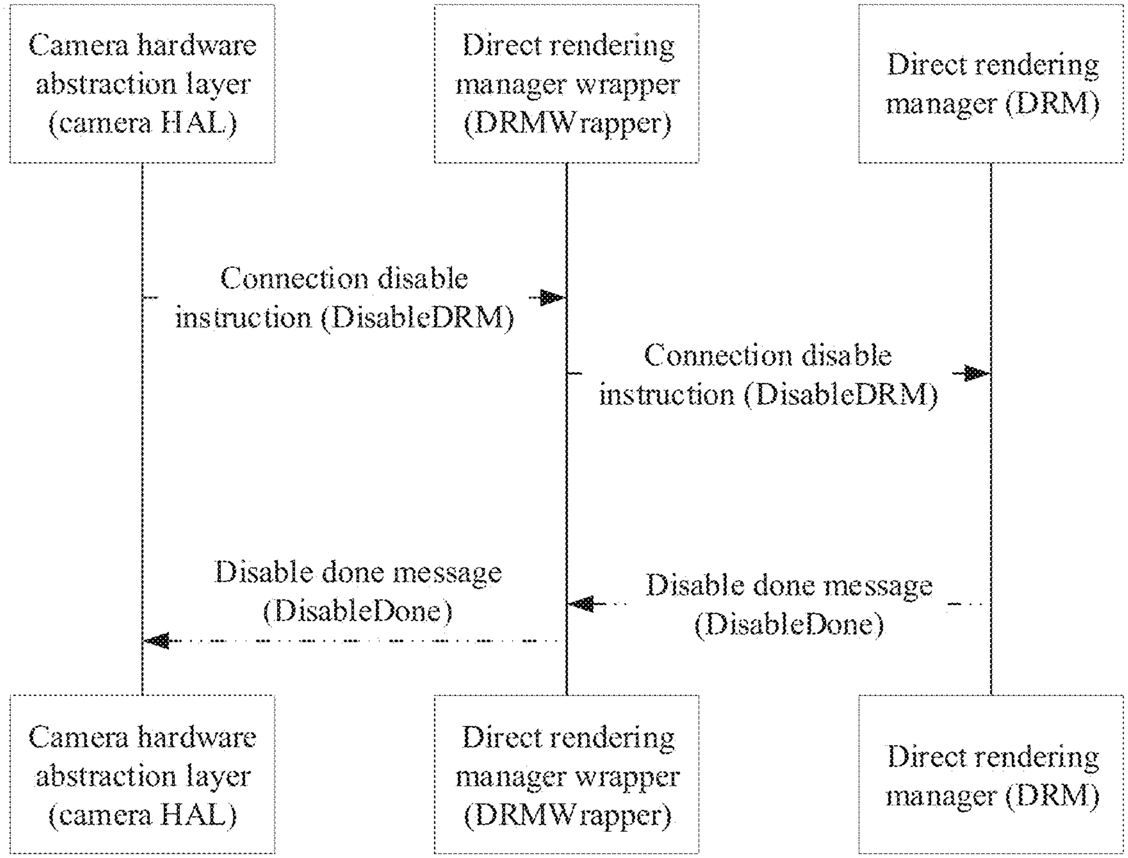
FIG. 6 is a schematic flowchart of a disable process of a first data transmission path according to an embodiment of this application.

Referring to FIG. 6, FIG. 6 is a schematic flowchart of disabling a connection between a direct rendering manager wrapper (DRMWrapper) and a direct rendering manager (DRM) by the camera hardware abstraction layer (camera HAL) in an embodiment of this disclosure. The camera hardware abstraction layer (camera HAL) sends a connection disable instruction (DisableDRM) to the direct rendering manager (DRM) through the direct rendering manager wrapper (DRMWrapper); and after receiving the connection disable instruction, the direct rendering manager (DRM) disables the connection to the direct rendering manager wrapper (DRMWrapper) and simultaneously releases the resources occupied by the direct rendering manager wrapper (DRMWrapper). Subsequently, the direct rendering manager wrapper (DRMWrapper) sends a disable done message (DisableDone) to the camera hardware abstraction layer (camera HAL).

Optionally, the establishing, by the camera hardware abstraction layer (camera HAL), a connection between the direct rendering manager wrapper (DRMWrapper) and the direct rendering manager (DRM) includes:

- acquiring, by the camera hardware abstraction layer (camera HAL), target configuration information, where the target configuration information is configuration information of the direct rendering manager (DRM);
- transmitting, by the camera hardware abstraction layer (camera HAL), the target configuration information to the direct rendering manager (DRM) through the first data transmission path; and in a case that the direct rendering manager (DRM) completes initialization based on the target configuration information, establishing a connection between the direct rendering manager wrapper (DRMWrapper) and the direct rendering manager (DRM).

Figure 7:
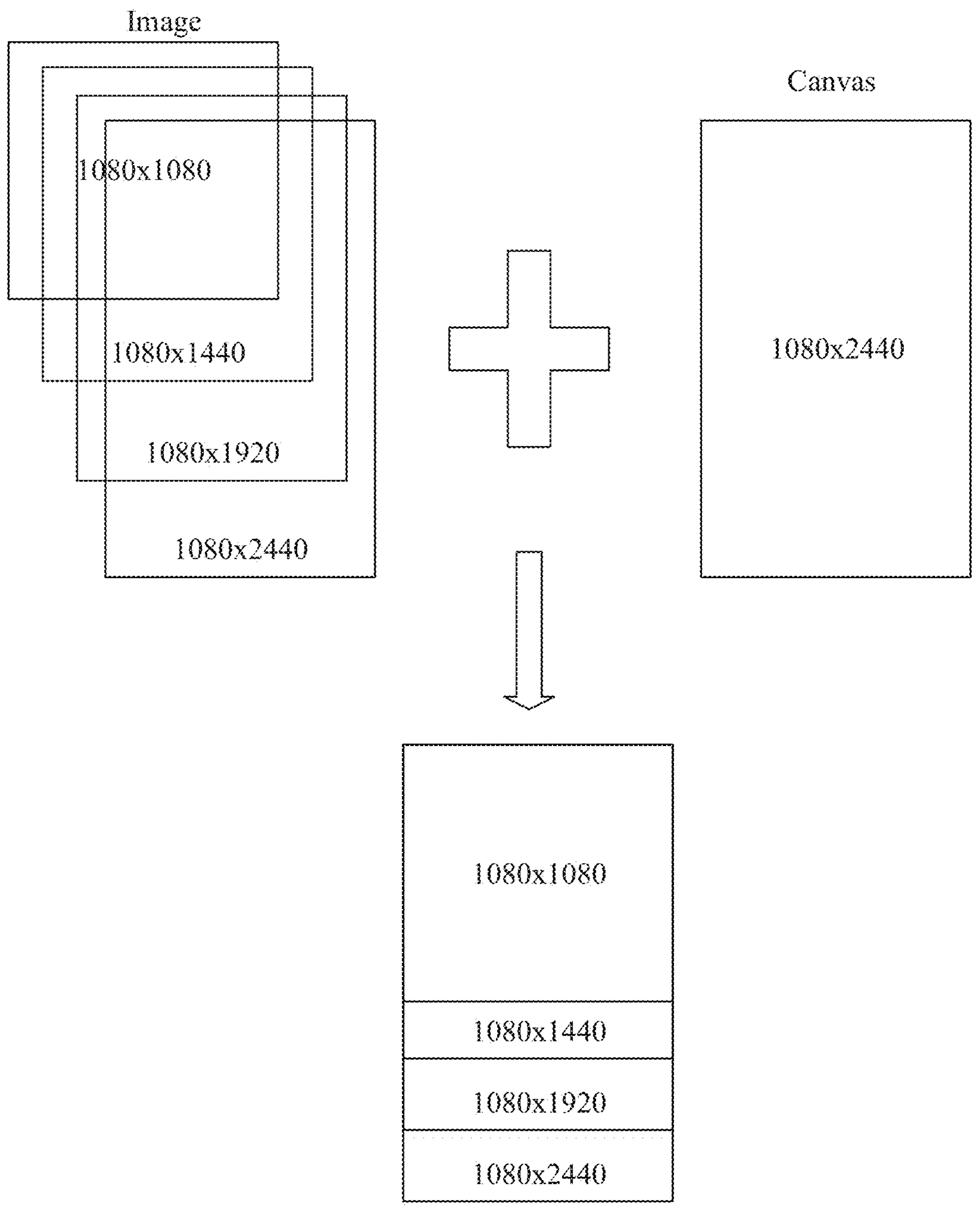
FIG. 7 is a schematic diagram of implementation of image rendering by a direct rendering manager according to an embodiment of this application.

The target configuration information may include configuration information such as frame rate and resolution required for initialization of the direct rendering manager (DRM). The resolution supported by the direct rendering manager (DRM) is limited. For example, in the related art, a maximum resolution supportable by the direct rendering manager (DRM) is: photo preview resolution: 1080×2400, and video recording resolution: 1080×1920. Therefore, to reduce the workload of displaying and adjusting the resolution of the direct rendering manager (DRM), the direct rendering manager (DRM) is configured with a maximum resolution. The target configuration information includes the following configuration information: photo preview resolution: 1080×2400, and video recording resolution: 1080×1920. FIG. 7 shows a schematic diagram of implementation of image rendering of the direct rendering manager (DRM), where a 1080×1080 image is rendered in a top-left corner of a 1080×2400 canvas.

Figure 4:
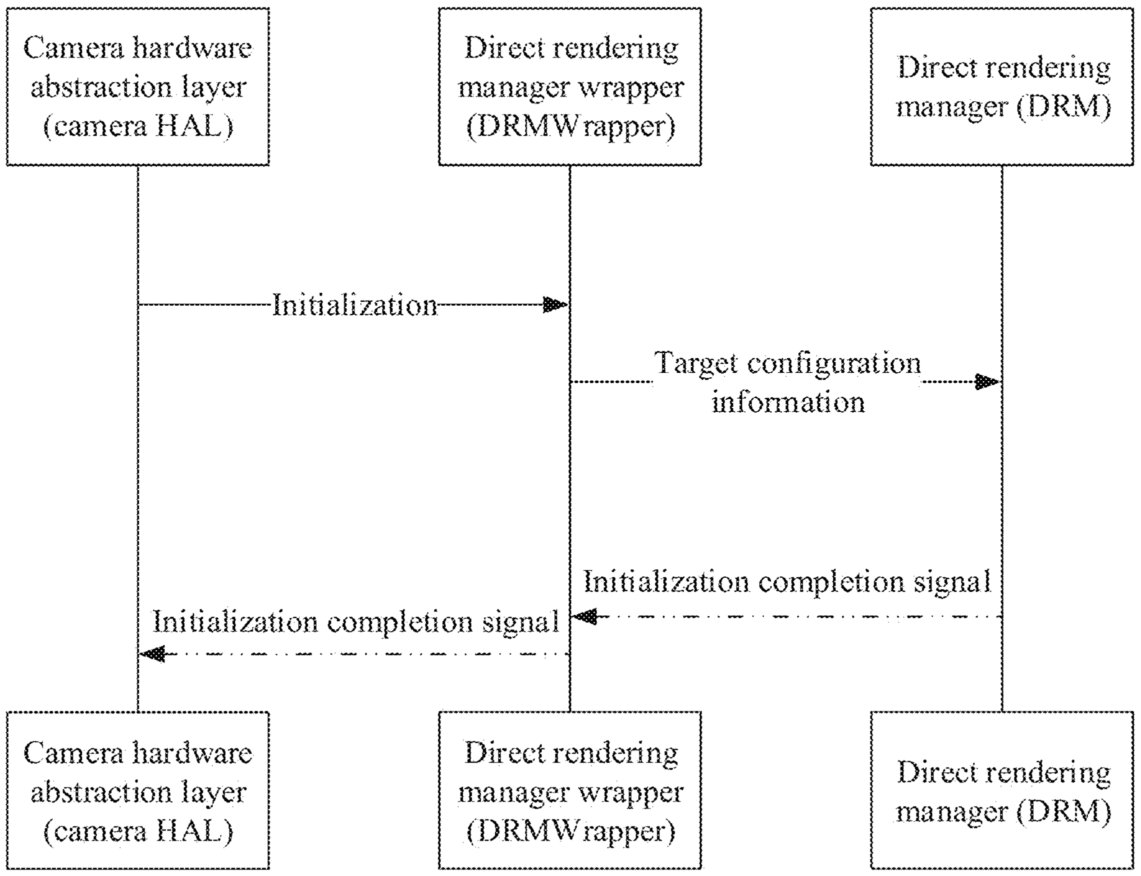
FIG. 4 is a schematic flowchart of initialization a direct rendering manager according to an embodiment of this application.
Figure 5:
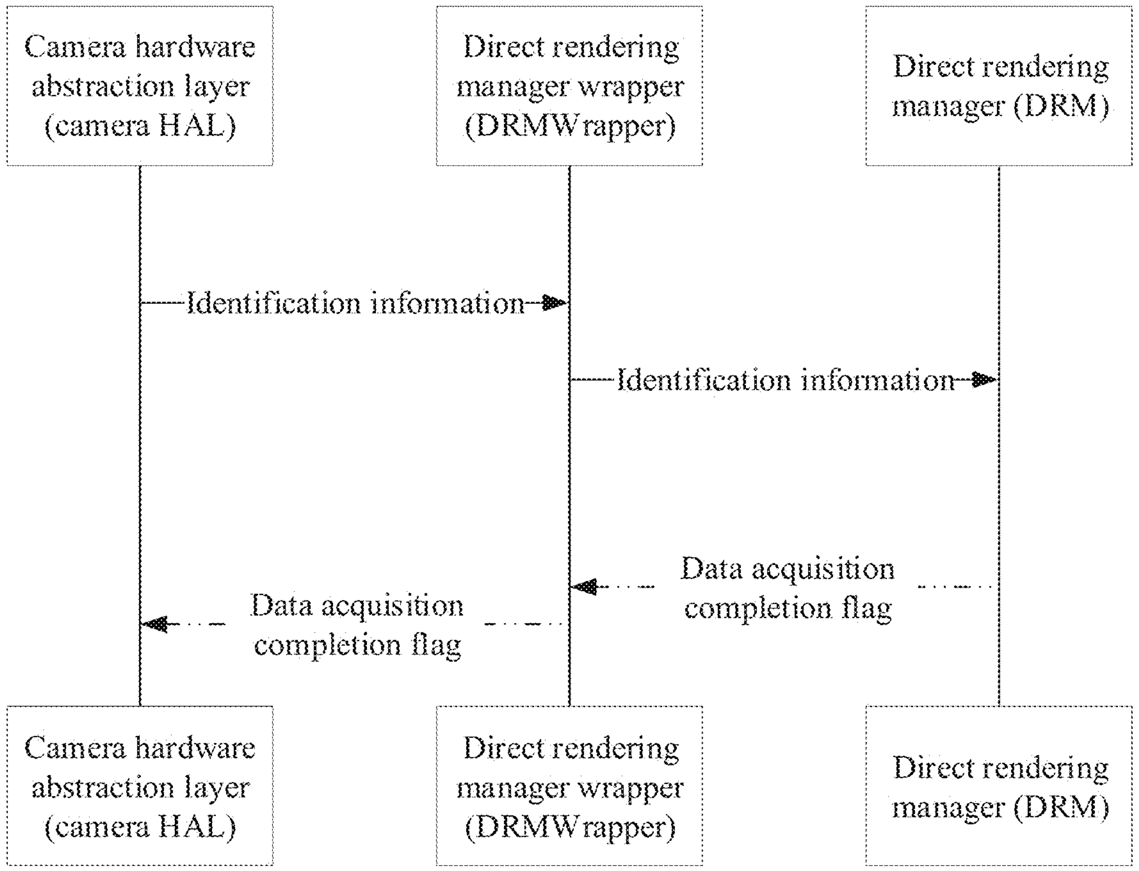
FIG. 5 is a schematic diagram of data transmission in a first data transmission path according to an embodiment of this application.

Referring to FIG. 4, an initialization process of the direct rendering manager (DRM) is as follows: the camera hardware abstraction layer (camera HAL) transmits the target configuration information to the direct rendering manager (DRM) through the direct rendering manager wrapper (DRMWrapper); the direct rendering manager (DRM) performs initialization based on the target configuration information; and after the initialization is completed, the direct rendering manager (DRM) feeds back an initialization completion signal to the camera hardware abstraction layer (camera HAL) through the direct rendering manager wrapper (DRMWrapper). After initialization completion is fed back to the camera hardware abstraction layer (camera HAL), the connection between the direct rendering manager wrapper (DRMWrapper) and the direct rendering manager (DRM) is established. Therefore, upon receiving the initialization completion signal, the camera hardware abstraction layer (camera HAL) may further transmit data to the direct rendering manager (DRM).

Optionally, the direct rendering manager (DRM) includes a first direct rendering management unit and a second direct rendering management unit, the camera hardware abstraction layer (camera HAL) is connected to the first direct rendering management unit, and the second direct rendering management unit is configured to be connected to a hardware composer (HWC).

Figure 3:
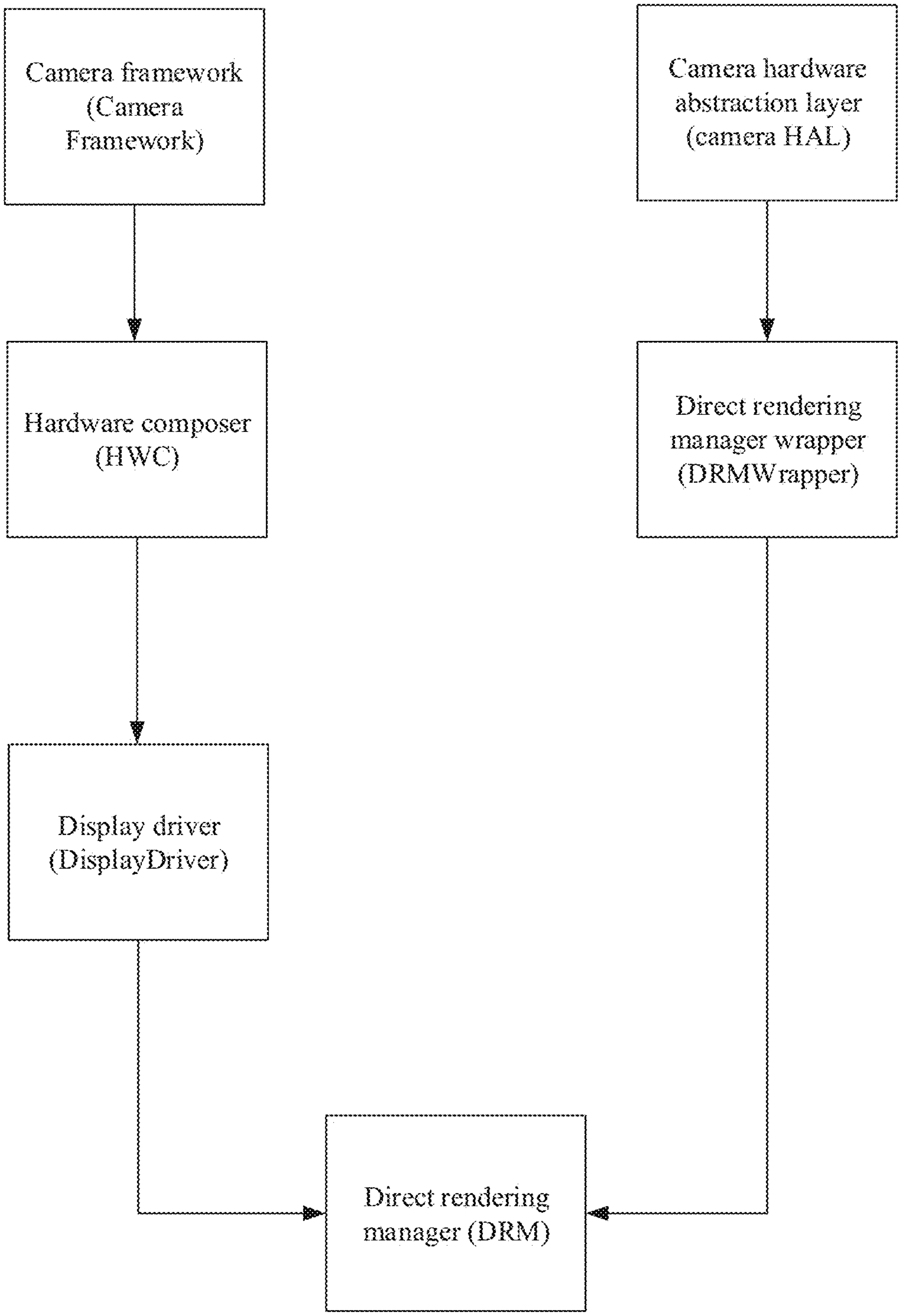
FIG. 3 is a schematic diagram of a connection between a first data transmission path and a second data transmission path according to an embodiment of this application.

Referring to FIG. 2 and FIG. 3, in an embodiment of this disclosure, in the image processing process of the image processing circuit, the first image data needs to be transmitted to the image enhancement chip through the first data transmission path for image enhancement, and the second image data processed by the image enhancement chip needs to be transmitted to a display screen through a second data transmission path for display, where the second data transmission path is: image enhancement chip→image processing module (not shown in the figure)→camera hardware abstraction layer (camera HAL)→camera service→camera framework→application (APP)→surface flinger→hardware composer (HWC)→direct rendering manager (DRM)→display hardware (Display HW)→display screen.

In addition, in this embodiment of this disclosure, after the image enhancement chip finishes processing the first image data to obtain the second image data, the second image data is not only displayed but also stored to generate video data including the second image data.

The first direct rendering management unit and the second direct rendering management unit may be two relatively independent rendering units obtained by partitioning rendering resources in the direct rendering manager (DRM). The first direct rendering management unit may be configured to process image data transmitted through the first data transmission path, while the second direct rendering management unit may be configured to process image data transmitted through the second data transmission path.

In this embodiment, the first data transmission path and the second data transmission path both need to occupy the resources in the direct rendering manager (DRM). Therefore, to avoid resource conflicts between the two paths, the resources in the direct rendering manager (DRM) are partitioned into two direct rendering management units, and the image data transmitted through different paths is processed by different direct rendering management units, thereby avoiding resource conflict issues.

FIG. 2 is a schematic structural diagram of an image processing circuit according to an embodiment of this disclosure. The image processing circuit includes:

- a main control chip and an image enhancement chip. The main control chip includes a camera hardware abstraction layer (camera HAL), a direct rendering manager (DRM), and display hardware (Display HW). The camera hardware abstraction layer (camera HAL) is connected to the image enhancement chip through a first data transmission path. The first data transmission path is formed by sequentially connecting the camera hardware abstraction layer (camera HAL), the direct rendering manager (DRM), the display hardware (Display HW), and the image enhancement chip.

The main control chip is configured to receive first image data acquired by an image sensor.

The camera hardware abstraction layer (camera HAL) is configured to transmit the first image data to the image enhancement chip through the first data transmission path.

The image enhancement chip is configured to perform image enhancement on the first image data to obtain second image data.

Optionally, the first data transmission path further includes a direct rendering manager wrapper (DRMWrapper), where a data sending software interface of the image sensor and a data sending software interface of the direct rendering manager (DRM) are both wrapped in the direct rendering manager wrapper (DRMWrapper). The camera hardware abstraction layer (camera HAL) is connected to the direct rendering manager (DRM) through the direct rendering manager wrapper (DRMWrapper).

Optionally, the direct rendering manager wrapper (DRMWrapper) is configured to convert a data format of the first image data into a format matching the direct rendering manager (DRM) to obtain first intermediate data;

the direct rendering manager wrapper (DRMWrapper) is configured to transmit the first intermediate data to the direct rendering manager (DRM);

the direct rendering manager (DRM) is configured to transmit the first intermediate data to the image enhancement chip through the display hardware (Display HW); and the image enhancement chip is configured to perform image enhancement on the first intermediate data to obtain the second image data.

Optionally, the first image data includes a first image and a shooting timestamp of the first image; the direct rendering manager (DRM) is configured to synthesize the first image and the shooting timestamp to obtain the second intermediate data; and the image enhancement chip is configured to perform image enhancement on the second intermediate data to obtain the second image data.

Optionally, the direct rendering manager wrapper (DRMWrapper) is configured to transmit identification information of a target buffer unit of the image sensor to the direct rendering manager (DRM), where the first intermediate data is stored in the target buffer unit; and The direct rendering manager (DRM) is configured to acquire the first intermediate data from the target buffer unit based on the identification information.

Optionally, in a case that the target buffer unit is accessed by the image sensor, an acquire fence (acquire_fence) identifier of the target buffer unit is enabled to reject access of the direct rendering manager (DRM) to the target buffer unit;

in a case that the image sensor ends the access to the target buffer unit, the acquire fence (acquire_fence) identifier is released to allow access of the direct rendering manager (DRM) to the target buffer unit;

in a case that the direct rendering manager (DRM) accesses the target buffer unit, a release fence (release_fence) identifier of the target buffer unit is enabled to reject access of the image sensor to the target buffer unit; and in a case that the direct rendering manager (DRM) ends the access to the target buffer unit, the release fence (release_fence) identifier is released to allow access of the image sensor to the target buffer unit.

Optionally, the camera hardware abstraction layer (camera HAL) is configured to establish a connection between the direct rendering manager wrapper (DRMWrapper) and the direct rendering manager (DRM) to enable the first data transmission path; and the camera hardware abstraction layer (camera HAL) is further configured to disable the connection between the direct rendering manager wrapper (DRMWrapper) and the direct rendering manager (DRM) to disable the first data transmission path.

Optionally, the camera hardware abstraction layer (camera HAL) is configured to acquire target configuration information, where the target configuration information is configuration information of the direct rendering manager (DRM);

the camera hardware abstraction layer (camera HAL) is configured to transmit the target configuration information to the direct rendering manager (DRM) through the first data transmission path; and in a case that the direct rendering manager (DRM) completes initialization based on the target configuration information, the connection between the direct rendering manager wrapper (DRMWrapper) and the direct rendering manager (DRM) is established.

Optionally, the direct rendering manager (DRM) includes a first direct rendering management unit and a second direct rendering management unit, the camera hardware abstraction layer (camera HAL) is connected to the first direct rendering management unit, and the second direct rendering management unit is configured to be connected to a hardware composer (HWC).

It can be understood that the image processing circuit provided in the embodiments of this disclosure can implement the processes of the image processing method of the foregoing embodiments, with the same beneficial effects achieved. To avoid repetition, details are not described herein again.

In this embodiment, the first image data is transmitted from the camera hardware abstraction layer (camera HAL) to the image enhancement chip through the first data transmission path, which can shorten the image data transmission path, as compared to an image data transmission method in the related art. Therefore, time consumption in an image data transmission process can be reduced, thereby reducing latency in an image processing process.

Figure 8:
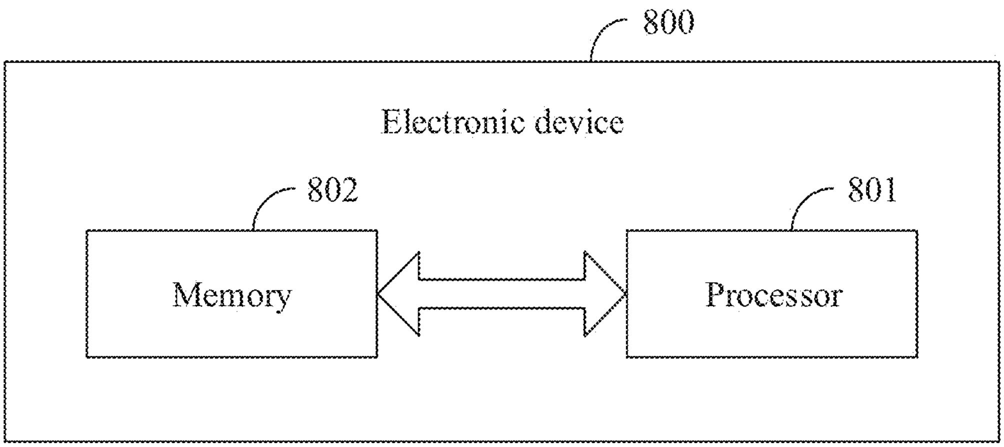
FIG. 8 is a schematic structural diagram of another electronic device according to an embodiment of this application.

Optionally, as shown in FIG. 8, an embodiment of this application further provides an electronic device 800 including a processor 801, a memory 802, and a program or instructions stored in the memory 802 and capable of running on the processor 801. When the program or instructions are executed by the processor 801, the processes of the foregoing image processing method embodiments are implemented, with the same technical effects achieved. To avoid repetition, details are not described herein again.

It should be noted that the electronic device in this embodiment of this application includes a mobile electronic device and a non-mobile electronic device.

Figure 9:
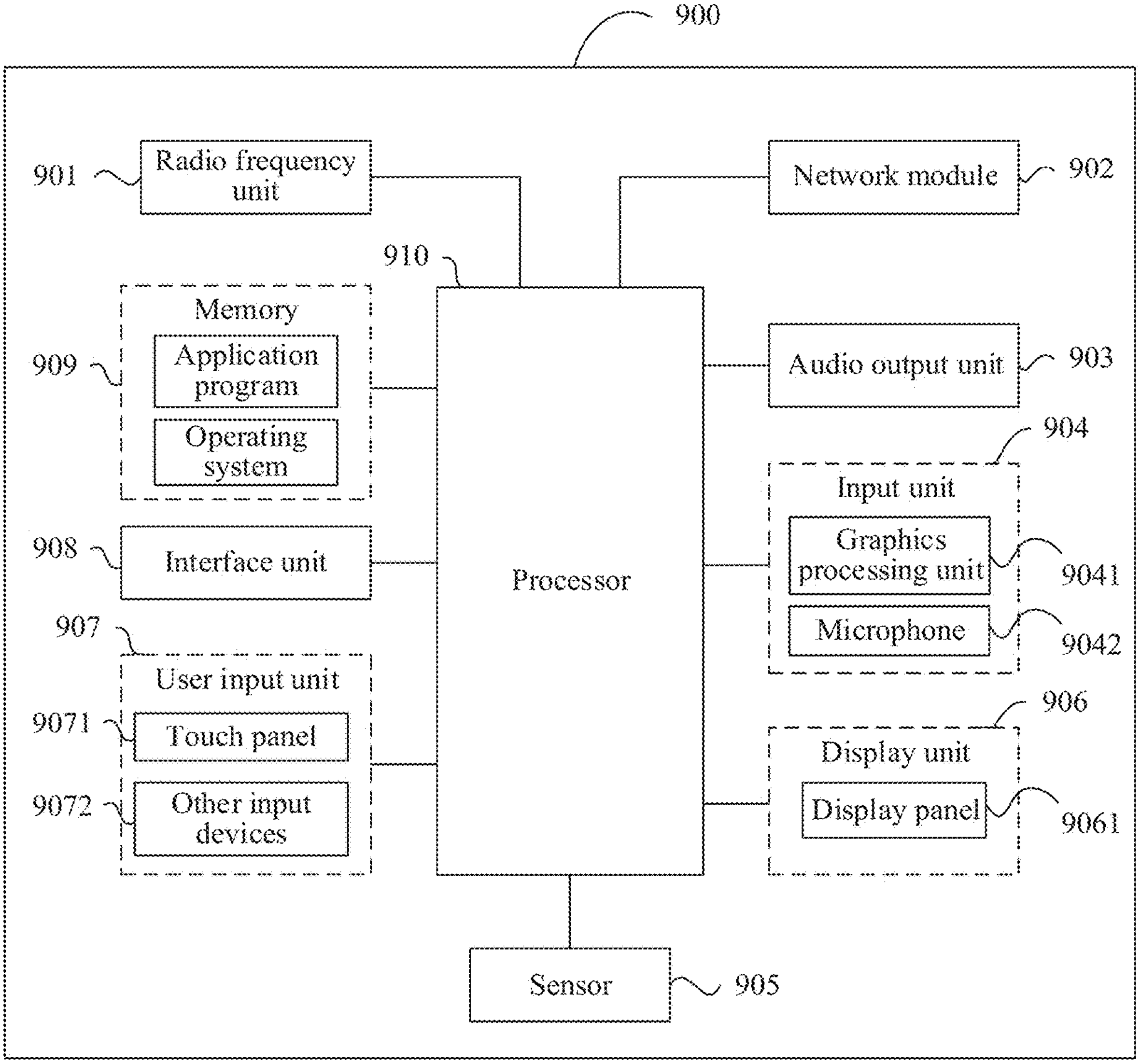
FIG. 9 is a schematic diagram of a hardware structure of an electronic device according to an embodiment of this application.

FIG. 9 is a schematic diagram of a hardware structure of an electronic device according to an embodiment of this application.

The electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

The processor 910 is configured to receive, based on a main control chip, first image data acquired by an image sensor.

The processor 910 is configured to transmit, based on a camera hardware abstraction layer (camera HAL) in the main control chip, the first image data to an image enhancement chip through a first data transmission path, where the first data transmission path is formed by sequentially connecting the camera hardware abstraction layer (camera HAL), a direct rendering manager (DRM), display hardware (Display HW), and the image enhancement chip.

The processor 910 is configured to perform, based on the image enhancement chip, image enhancement on the first image data to obtain second image data.

Optionally, the processor 910 is configured to convert, based on the direct rendering manager wrapper (DRMWrapper), a data format of the first image data into a format matching the direct rendering manager (DRM) to obtain first intermediate data;

the processor 910 is configured to transmit, based on the direct rendering manager wrapper (DRMWrapper), the first intermediate data to the direct rendering manager (DRM);

the processor 910 is configured to transmit, based on the direct rendering manager (DRM), the first intermediate data to the image enhancement chip through the display hardware (Display HW); and the processor 910 is configured to perform, based on the image enhancement chip, image enhancement on the first intermediate data to obtain the second image data.

Optionally, the processor 910 is configured to synthesize, based on the direct rendering manager (DRM), the first image and the shooting timestamp to obtain the second intermediate data; and the processor 910 is configured to perform, based on the image enhancement chip, image enhancement on the second intermediate data to obtain the second image data.

Optionally, the processor 910 is configured to transmit, based on the direct rendering manager wrapper (DRMWrapper), identification information of a target buffer unit of the image sensor to the direct rendering manager (DRM), where the first intermediate data is stored in the target buffer unit; and the processor 910 is configured to acquire the first intermediate data from the target buffer unit based on the identification information.

Optionally, the processor 910 is configured to establish, based on the camera hardware abstraction layer (camera HAL), a connection between the direct rendering manager wrapper (DRMWrapper) and the direct rendering manager (DRM) in a case that a brightness parameter in the first image data indicates that an ambient brightness is lower than a preset brightness threshold, so as to enable the first data transmission path; and the processor 910 is configured to disable, based on the camera hardware abstraction layer (camera HAL), the connection between the direct rendering manager wrapper (DRMWrapper) and the direct rendering manager (DRM) in a case that the brightness parameter in the first image data indicates that the ambient brightness is not lower than the preset brightness threshold, so as to disable the first data transmission path.

Optionally, the processor 910 is configured to acquire, based on the camera hardware abstraction layer (camera HAL), target configuration information, where the target configuration information is configuration information of the direct rendering manager (DRM);

the processor 910 is configured to transmit, based on the camera hardware abstraction layer (camera HAL), the target configuration information to the direct rendering manager (DRM) through the first data transmission path; and the processor 910 is configured to establish the connection between the direct rendering manager wrapper (DRMWrapper) and the direct rendering manager (DRM) in a case that the direct rendering manager (DRM) completes initialization based on the target configuration information.

Persons skilled in the art can understand that the electronic device 900 may further include a power supply (for example, a battery) that supplies power to various components. The power supply may be logically connected to the processor 910 through a power management system, so that functions such as charge management, discharge management, and power consumption management are implemented by using the power management system. The structure of the electronic device shown in FIG. 9 does not constitute a limitation on the electronic device. The electronic device may include more or fewer components than those shown in the figure, or some components may be combined, or there may be a different component layout. Details are not described herein again.

It can be understood that in this embodiment of this application, the input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, or the like. The user input unit 907 includes a touch panel 9071 and other input devices 9072. The touch panel 9071 is also referred to as a touchscreen. The touch panel 9071 may include two parts: a touch detection apparatus and a touch controller. The other input devices 9072 may include but be not limited to a physical keyboard, a function button (such as a volume control button or an on/off button), a trackball, a mouse, and a joystick. Details are not described herein. The memory 909 may be configured to store software programs and various data which include but are not limited to an application program and an operating system. The processor 910 may integrate an application processor and a modem processor, where the application processor mainly processes an operating system, a user interface, an application program, and the like, and the modem processor mainly processes wireless communication. It can be understood that the modem processor may alternatively be not integrated into the processor 910.

An embodiment of this application further provides a readable storage medium, where a program or instructions are stored in the readable storage medium. When the program or instructions are executed by a processor, the processes of the foregoing image processing method embodiments are implemented, with the same technical effects achieved. To avoid repetition, details are not described herein again.

The processor is a processor in the electronic device described in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing image processing method embodiments, with the same technical effects achieved. To avoid repetition, details are not described herein again.

It should be understood that the chip mentioned in this embodiment of this application may also be referred to as a system on chip, a system chip, a chip system, a system-on-chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and various steps may alternatively be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

Specifically, the contrast and brightness of the first image data can be detected by the camera hardware abstraction layer (Camera HAL) of the main control chip, and a logic for determining whether a shooting scenario of the first image data is a preset scenario can be pre-configured in the main control chip. For example, relevant threshold determining conditions related to the contrast and brightness can be pre-configured. Upon detecting the contrast and brightness of the first image data, the Camera HAL compares detected values of the contrast and brightness with the threshold determining conditions, determines that the first image data is located in the preset scenario in a case that the threshold determining conditions are met, and correspondingly determines that the first image data is located in another scenario other than the preset scenario in a case that the threshold determining conditions are not met.

In a case that the first image data is located in the preset scenario, that is, in a case that the shooting environment is poor, the first image data may be subjected to processes such as brightness enhancement, color enhancement, and contrast enhancement by the image enhancement chip, thereby improving the quality of images outputted by the electronic device.

The invention claimed is:

1. An image processing method, comprising:

receiving, by a main control chip, first image data acquired by an image sensor;

transmitting, by a camera hardware abstraction layer in the main control chip, the first image data to an image enhancement chip through a first data transmission path, wherein the first data transmission path is formed by sequentially connecting the camera hardware abstraction layer, a direct rendering manager, display hardware, and the image enhancement chip; and performing, by the image enhancement chip, image enhancement on the first image data to obtain second image data.

2. The method according to claim 1, wherein the first data transmission path further comprises a direct rendering manager wrapper; wherein a data sending software interface of the image sensor and a data sending software interface of the direct rendering manager are both wrapped in the direct rendering manager wrapper; and the camera hardware abstraction layer is connected to the direct rendering manager through the direct rendering manager wrapper.

3. The method according to claim 2, wherein the transmitting, by a camera hardware abstraction layer in the main control chip, the first image data to an image enhancement chip through a first data transmission path comprises:

converting, by the direct rendering manager wrapper, a data format of the first image data into a format matching the direct rendering manager to obtain first intermediate data;

transmitting, by the direct rendering manager wrapper, the first intermediate data to the direct rendering manager; and transmitting, by the direct rendering manager, the first intermediate data to the image enhancement chip through the display hardware; and the performing, by the image enhancement chip, image enhancement on the first image data to obtain second image data comprises:

performing, by the image enhancement chip, image enhancement on the first intermediate data to obtain the second image data.

4. The method according to claim 3, wherein the transmitting, by the direct rendering manager wrapper, the first intermediate data to the direct rendering manager comprises:

transmitting, by the direct rendering manager wrapper, identification information of a target buffer unit of the image sensor to the direct rendering manager, wherein the first intermediate data is stored in the target buffer unit; and acquiring, by the direct rendering manager based on the identification information, the first intermediate data from the target buffer unit.

5. The method according to claim 4, wherein the method further comprises:

in a case that the target buffer unit is accessed by the image sensor, enabling an acquire fence identifier of the target buffer unit to reject access of the direct rendering manager to the target buffer unit;

in a case that the image sensor ends the access to the target buffer unit, releasing the acquire fence identifier to allow access of the direct rendering manager to the target buffer unit;

in a case that the direct rendering manager accesses the target buffer unit, enabling a release fence identifier of the target buffer unit to reject access of the image sensor to the target buffer unit; and in a case that the direct rendering manager ends the access to the target buffer unit, releasing the release fence identifier to allow access of the image sensor to the target buffer unit.

6. The method according to claim 2, wherein the method further comprises:

in a case that a brightness parameter in the first image data indicates that an ambient brightness is lower than a preset brightness threshold, establishing, by the camera hardware abstraction layer, a connection between the direct rendering manager wrapper and the direct rendering manager to enable the first data transmission path; and in a case that the brightness parameter in the first image data indicates that the ambient brightness is not lower than the preset brightness threshold, releasing, by the camera hardware abstraction layer, the connection between the direct rendering manager wrapper and the direct rendering manager to disable the first data transmission path.

7. The method according to claim 6, wherein the establishing, by the camera hardware abstraction layer, a connection between the direct rendering manager wrapper and the direct rendering manager comprises:

acquiring, by the camera hardware abstraction layer, target configuration information, wherein the target configuration information is configuration information of the direct rendering manager;

transmitting, by the camera hardware abstraction layer, the target configuration information to the direct rendering manager through the first data transmission path; and in a case that the direct rendering manager completes initialization based on the target configuration information, establishing the connection between the direct rendering manager wrapper and the direct rendering manager.

8. The method according to claim 1, wherein the first image data comprises a first image and a shooting timestamp of the first image; the transmitting, by a camera hardware abstraction layer in the main control chip, the first image data to an image enhancement chip through a first data transmission path comprises:

in a case that the first image data is transmitted to the direct rendering manager, synthesizing, by the direct rendering manager, the first image and the shooting timestamp to obtain second intermediate data; and the performing, by the image enhancement chip, image enhancement on the first image data to obtain second image data comprises:

performing, by the image enhancement chip, image enhancement on the second intermediate data to obtain the second image data.

9. The method according to claim 1, wherein the direct rendering manager comprises a first direct rendering management unit and a second direct rendering management unit, the camera hardware abstraction layer is connected to the first direct rendering management unit, and the second direct rendering management unit is configured to be connected to a hardware composer.

10. A non-transitory readable storage medium, wherein the non-transitory readable storage medium stores a program or instructions, and when the program or instructions are executed by a processor, the steps of the image processing method according to claim 1 are implemented.

11. An image processing circuit, comprising a main control chip and an image enhancement chip, wherein the main control chip comprises a camera hardware abstraction layer, a direct rendering manager, and display hardware; the camera hardware abstraction layer is connected to the image enhancement chip through a first data transmission path; and the first data transmission path is formed by sequentially connecting the camera hardware abstraction layer, the direct rendering manager, the display hardware, and the image enhancement chip;

the main control chip is configured to receive first image data acquired by an image sensor;

the camera hardware abstraction layer is configured to transmit the first image data to the image enhancement chip through the first data transmission path; and the image enhancement chip is configured to perform image enhancement on the first image data to obtain second image data.

12. The image processing circuit according to claim 11, wherein the first data transmission path further comprises a direct rendering manager wrapper; wherein a data sending software interface of the image sensor and a data sending software interface of the direct rendering manager are both wrapped in the direct rendering manager wrapper; and the camera hardware abstraction layer is connected to the direct rendering manager through the direct rendering manager wrapper.

13. The image processing circuit according to claim 12, wherein the direct rendering manager wrapper is configured to convert a data format of the first image data into a format matching the direct rendering manager to obtain first intermediate data;

the direct rendering manager wrapper is configured to transmit the first intermediate data to the direct rendering manager;

the direct rendering manager is configured to transmit the first intermediate data to the image enhancement chip through the display hardware; and the image enhancement chip is configured to perform image enhancement on the first intermediate data to obtain the second image data.

14. The image processing circuit according to claim 13, wherein the direct rendering manager wrapper is configured to transmit identification information of a target buffer unit of the image sensor to the direct rendering manager, wherein the first intermediate data is stored in the target buffer unit; and the direct rendering manager is configured to acquire, based on the identification information, the first intermediate data from the target buffer unit.

15. The image processing circuit according to claim 14, wherein in a case that the target buffer unit is accessed by the image sensor, an acquire fence identifier of the target buffer unit is enabled to reject access of the direct rendering manager to the target buffer unit;

in a case that the image sensor ends the access to the target buffer unit, the acquire fence identifier is released to allow access of the direct rendering manager to the target buffer unit;

in a case that the direct rendering manager accesses the target buffer unit, a release fence identifier of the target buffer unit is enabled to reject access of the image sensor to the target buffer unit; and in a case that the direct rendering manager ends the access to the target buffer unit, the release fence identifier is released to allow access of the image sensor to the target buffer unit.

16. The image processing circuit according to claim 12, wherein the camera hardware abstraction layer is configured to establish a connection between the direct rendering manager wrapper and the direct rendering manager to enable the first data transmission path; and the camera hardware abstraction layer is further configured to disable the connection between the direct rendering manager wrapper and the direct rendering manager to disable the first data transmission path.

17. The image processing circuit according to claim 16, wherein the camera hardware abstraction layer is configured to acquire target configuration information, wherein the target configuration information is configuration information of the direct rendering manager;

the camera hardware abstraction layer is configured to transmit the target configuration information to the direct rendering manager through the first data transmission path; and in a case that the direct rendering manager completes initialization based on the target configuration information, the connection between the direct rendering manager wrapper and the direct rendering manager is established.

18. The image processing circuit according to claim 11, wherein the first image data comprises a first image and a shooting timestamp of the first image; the direct rendering manager is configured to synthesize the first image and the shooting timestamp to obtain second intermediate data; and the image enhancement chip is configured to perform image enhancement on the second intermediate data to obtain the second image data.

19. The image processing circuit according to claim 11, wherein the direct rendering manager comprises a first direct rendering management unit and a second direct rendering management unit, the camera hardware abstraction layer is connected to the first direct rendering management unit, and the second direct rendering management unit is configured to be connected to a hardware composer.

20. An electronic device, comprising a processor and a memory, wherein the memory stores a program or instructions capable of running on the processor, wherein the program or instructions, when executed by the processor, cause the processor to perform:

receiving first image data acquired by an image sensor;

transmitting the first image data to an image enhancement chip through a first data transmission path, wherein the first data transmission path is formed by sequentially connecting the camera hardware abstraction layer, a direct rendering manager, display hardware, and the image enhancement chip; and performing image enhancement on the first image data to obtain second image data.

* * * * *